(12) United States Patent
Brennan (10) Patent No.: US 7,590,859 B2
(45) Date of Patent: *Sep. 15, 2009

(54) SYSTEM AND METHOD FOR ACCOMPLISHING TWO-FACTOR USER AUTHENTICATION USING THE INTERNET

(75) Inventor: Sean Brennan, Merrimac, MA (US)

(73) Assignee: Secure Computing Corporation, San Jose, CA (US)

( * ) Notice: Subject to any disclaimer, the term of this patent is extended or adjusted under 35 U.S.C. 154(b) by 1180 days.

This patent is subject to a terminal disclaimer.

(21) Appl. No.: 10/050,752

(22) Filed: Jan. 16, 2002

(65) Prior Publication Data

US 2003/0046551 A1  Mar. 6, 2003

(51) Int. Cl.
- H04L 9/32 (2006.01)
- G06F 21/00 (2006.01)
- G06F 7/04 (2006.01)
- G06F 17/30 (2006.01)

(52) U.S. Cl. ............... 713/185; 713/159; 713/184; 713/186; 713/172; 726/9; 709/229; 715/742

(58) Field of Classification Search .......... 713/159, 713/184, 185, 186, 172; 726/9, 28; 709/229; 715/742

See application file for complete search history.

(56) References Cited

U.S. PATENT DOCUMENTS

| | | | | |
|---|---|---|---|---|
| 4,720,860 | A * | 1/1988 | Weiss | 713/184 |
| 4,998,279 | A * | 3/1991 | Weiss | 340/5.52 |
| 5,280,527 | A | 1/1994 | Gullman et al. | |
| 5,475,758 | A | 12/1995 | Kikuchi | |
| 5,657,388 | A * | 8/1997 | Weiss | 713/185 |
| 5,850,442 | A | 12/1998 | Muftic | |
| 6,199,113 | B1 | 3/2001 | Alegre et al. | |
| 6,246,770 | B1 * | 6/2001 | Stratton et al. | 380/281 |
| 6,263,432 | B1 * | 7/2001 | Sasmazel et al. | 713/100 |
| 6,317,838 | B1 | 11/2001 | Baize | |
| 6,418,225 | B2 * | 7/2002 | Stratton et al. | 380/281 |
| 6,466,917 | B1 * | 10/2002 | Goyal et al. | 705/18 |
| 6,481,621 | B1 * | 11/2002 | Herrendoerfer et al. | 235/380 |
| 6,490,624 | B1 * | 12/2002 | Sampson et al. | 709/227 |
| 6,499,109 | B1 * | 12/2002 | Balasubramaniam et al. | 726/22 |

(Continued)

FOREIGN PATENT DOCUMENTS

EP  1089516 A2 * 4/2001

(Continued)

OTHER PUBLICATIONS

Aladdin. "eToken: The Key to Security for the Internet Age", Jul. 2000.*

(Continued)

Primary Examiner—Michael J Simitoski
(74) Attorney, Agent, or Firm—Schwegman, Lundberg & Woessner, P.A.

(57) ABSTRACT

A method of accomplishing two-factor user authentication, comprising providing two separate user authentication methods, enabling a user to communicate authentication data for both authentication methods to a first web site using the internet, and enabling the communication of at least some of the authentication data from the first web site to a second web site also using the internet. Both web sites are thus involved in user authentication using the authentication data.

14 Claims, 8 Drawing Sheets

U.S. PATENT DOCUMENTS

| | | | |
|---|---|---|---|
| 6,510,236 B1 | 1/2003 | Crane et al. | |
| 6,523,027 B1 | 2/2003 | Underwood | |
| 6,549,773 B1* | 4/2003 | Linden et al. | 455/426.1 |
| 6,601,233 B1 | 7/2003 | Underwood | |
| 6,607,136 B1 | 8/2003 | Atsmon et al. | |
| 6,609,128 B1 | 8/2003 | Underwood | |
| 6,633,878 B1 | 10/2003 | Underwood | |
| 6,662,228 B1 | 12/2003 | Limsico | |
| 6,704,873 B1 | 3/2004 | Underwood | |
| 6,718,535 B1 | 4/2004 | Underwood | |
| 6,853,980 B1* | 2/2005 | Ying et al. | 705/27 |
| 6,853,988 B1 | 2/2005 | Dickinson et al. | |
| 6,892,307 B1 | 5/2005 | Wood et al. | |
| 2001/0005886 A1* | 6/2001 | Stratton et al. | 713/166 |
| 2001/0032175 A1* | 10/2001 | Holden et al. | 705/37 |
| 2001/0037466 A1* | 11/2001 | Fukutake et al. | 713/201 |
| 2001/0044896 A1* | 11/2001 | Schwartz et al. | 713/169 |
| 2001/0045451 A1* | 11/2001 | Tan et al. | 235/375 |
| 2002/0010679 A1* | 1/2002 | Felsher | 705/51 |
| 2002/0032668 A1* | 3/2002 | Kohler et al. | 705/401 |
| 2002/0049806 A1* | 4/2002 | Gatz et al. | 709/203 |
| 2002/0059531 A1* | 5/2002 | Lai On | 713/202 |
| 2002/0067832 A1 | 6/2002 | Jablon | |
| 2002/0069174 A1 | 6/2002 | Fox et al. | |
| 2002/0073057 A1* | 6/2002 | Benoit et al. | 707/1 |
| 2002/0077837 A1* | 6/2002 | Krueger et al. | 705/1 |
| 2002/0078152 A1* | 6/2002 | Boone | 709/204 |
| 2002/0152395 A1* | 10/2002 | Zhang et al. | 713/200 |
| 2003/0028495 A1 | 2/2003 | Pallante | |
| 2004/0172531 A1* | 9/2004 | Little et al. | 713/155 |
| 2005/0015588 A1* | 1/2005 | Lin et al. | 713/159 |
| 2005/0036615 A1* | 2/2005 | Jakobsson et al. | 380/255 |
| 2005/0091492 A1* | 4/2005 | Benson et al. | 713/170 |
| 2007/0136799 A1 | 6/2007 | Brennan | |

FOREIGN PATENT DOCUMENTS

| | | |
|---|---|---|
| WO | WO-01/22650 A2 | 3/2001 |
| WO | WO-01/33359 A1 | 5/2001 |
| WO | WO-01/72009 A2 | 9/2001 |

OTHER PUBLICATIONS

Aladdin. "eToken: Implementing Corporate and e-Commerce Security Using Strong Authentication", Mar. 2000.*

IBM. IBM Technical Disclosure Bulletin NNRD429128, Jan. 2000.*

Mudge and Kingpin. "Initial Cryptanalysis of the RSA SecurID Algorithm", Jan. 2001.*

RSA Security, Inc. "RSA Web Security Portfolio—How RSA SecurID Agents Can Secure Your Website", Aug. 2000.*

Stallings, William. Network Security Essentials Applications and Standards, 2000 Prentice-Hall, Inc., pp. 203-223.*

Weiss, Kenneth P. "When a Password is Not a Password", 1990 IEEE.*

"U.S. Appl. No. 10/050,752, Advisory Action mailed Oct. 26, 2006", 2 pgs.

"U.S. Appl. No. 10/050,752, Advisory Action mailed Aug. 3, 2006", 3 pgs.

"U.S. Appl. No. 11/678,921, Non-Final Office Action mailed Mar. 14, 2008", 12 pgs.

"U.S. Appl. No. 11/678,921, Response filed Jun. 18, 2008 to Non Final Office Action mailed Mar. 14, 2008", 13 pgs.

"U.S. Appl. No. 11/678,921, Notice of Allowance mailed Oct. 7, 2008", 11 pgs.

"U.S. Appl. No. 11/678,921 Notice of Allowance mailed Jan. 8, 2009", 8 pgs.

* cited by examiner

SYSTEM AND METHOD FOR ACCOMPLISHING TWO-FACTOR USER AUTHENTICATION USING THE INTERNET

FIELD OF THE INVENTION

This invention relates to a system and method for accomplishing two-factor authentication using the internet.

BACKGROUND OF THE INVENTION

More and more, access to computer networks, web sites and the like is controlled by some type of security procedure. User names and passwords are commonly required for access to sensitive information at web sites. This provides a level of security, but can be breached by several relatively easy means, such as observance of a user or interception of the login signals as they are transmitted over the network or internet.

Token-based security is used typically for employee access to private networks. A token is a non-predictable code derived from both private and public information. The code is unique for each use. Thus, observation or interception of a token code is useless to the party intercepting the code, because by definition the code will not be used a second time. However, anyone who possesses the token generating software or device, by definition has access to the token codes. Thus, token-based security is dependent on possession of or access to software or a token-generating device, and so this security can be fairly easily breached.

SUMMARY OF THE INVENTION

It is therefore an object of this invention to provide a two-factor authentication system and method that uses the internet as the communications medium.

It is a further object of this invention to provide such a system and method that provides an additional layer of security to protect against online identity fraud.

It is a further object of this invention to provide such a system and method that reduces the risk of security breaches from password cracking.

It is a further object of this invention to provide such a system and method that allows a third party to provide additional online security to communications between a consumer and a business over the internet.

If is a further object of this invention to provide such a system and method that allows the consumer to have more control over internet-based security.

This invention results from the realization that increased internet communications security can be accomplished using two-factor authentication in which the user communicates authentication data for both authentication methods to a web site using the internet, and that web site then communicates with another web site to complete the authentication process.

In one embodiment of the invention, a hardware or software token is employed to accomplish one authentication method. The method is preferably accomplished across multiple secure web sites. Users enter data relating to one authentication method (e.g., their username and password). Users also enter data relating to the other authentication method.

For the token-based system, users are provided a token. Once users activate their token, they are required to use the token to authenticate (login) at the web site where the token was activated. A third field can be added to the username and password login page, so that a user can enter the one-time code generated by the token.

The first web site authenticates the user using one authentication method, for example the username and password. The second web site authenticates the user using the second authentication method. In one embodiment, once the first web site successfully authenticates the user using the first authentication method, the first web site transmits to the second web site over the internet user identification data, and the user-entered data relating to the second authentication method. For example, the first web site can transmit the username, the token code and a clientID to the second enabling web site for further authentication. At the second site, the user is authenticated using the second authentication method (e.g., the token). Authentication results are then returned from the second web site to the login web site, which admits or denies entry to the user based on the results of the two authentications.

Broadly, the invention comprises a method of accomplishing two-factor user authentication. The method contemplates the provision of two separate user authentication methods. A user is enabled to communicate authentication data for both authentication methods to a first web site, preferably using the internet. At least some of the authentication data are communicated using the internet from the first web site to a second web site. Both web sites are involved in user authentication using the authentication data. Preferably, the second authentication method is one which can be used across multiple web sites that support the method, although it is possible to have a unique method (e.g., a one-time passcode) for each web site to be accessed by the user.

The first web site may initially authenticate the user based on the data relating to one of the authentication methods. The second web site may complete user authentication based on the data relating to the other authentication method. The first web site may communicate with the second web site only if the user is initially authenticated. The first web site may communicate to the second web site at least user-identification data, and data relating to the other authentication method.

One authentication method may employ a password. One authentication method may employ a token. The token may be hardware-based, and generate a code that comprises at least some of the data for the authentication method. The token may be a stand-alone, portable hardware device. The token may be embedded in a device such as a cell phone or a personal computer. The token may be USB-based and accessed by a browser. The token may be software-based, and generate a code that comprises at least some of the data for the authentication method. The software token may comprise a browser plug-in.

The second authentication method may comprise a one-time passcode, in some fashion. The one-time passcode can be generated by a hardware token, a piece of stand-alone software (the software token), or a piece of embedded software in a cell-phone or a USB device. However, the second authentication method does not have to be one-time. For example, the PIN used with a bank card is not a one-time PIN.

PKI (Public Key Infrastructure) can be used as the second authentication method as well. The public keys (one per user) would be stored on a server at one of the involved web sites, and the user would login with username-password. An encrypted or signed message would then be sent to the web site using the user's private key. The server would decrypt the message and would OK users who were successfully decrypted. In order to handle this scheme, the first web site would have to have means to receive encrypted messages and then to send them to the second web site for decryption. As an implementation issue, this is more complicated, but conceptually it is within the same idea.

The second authentication method may comprise a one-time passcode, in some fashion.

Examples include the following:
1. Fixed simple codes such as a PIN that can be looked up in a database.
2. Fixed complex codes (PKI). Use public key to decrypt privately encrypted message.
3. One-time codes (e.g., a token). Requires a seed value which the token has and the web servers have, and a common algorithm used by the token and the server to generate the next item in a sequence, starting from the seed.
4. Complex, one-time codes. For example, encrypt the token code using PKI, and then decrypt it. This would protect against race attacks, where someone would monitor the network, intercept the one-time pass code, block the code from getting to the web site, then use the code from another browser. If the token code is encrypted with PKI, this cannot be done.

In another embodiment, the invention comprises a method of implementing token-based electronic security across multiple secure web sites, in which the user has a security token, the inventive method comprising storing unique token identification information, and the seed value of each token, in a security system; requiring the user, upon login to a secure web site, to enter at least the code generated by the user's token; passing the user's token code from the web site to the security system; using the security system to verify whether or not the user's token code was generated by the user's token; and passing the verification information from the security system to the web site, for use in web site security.

The requiring step may further require the user to enter a user name and user password. The method may further comprise the step of the web site verifying the user name and user password before passing the user's token code to the security system.

This invention in one embodiment features a method of implementing token-based electronic security across multiple secure web sites, in which the user has a security token, comprising storing unique token identification information, and the seed value of each token, in a security system, requiring the user, upon login to a secure web site, to enter at least the code generated by the user's token, passing the user's token code from the web site to the security system, using the security system to verify whether or not the user's token code was generated by the user's token, and passing the verification information from the security system to the web site, for use in web site security.

The requiring step may further require the user to enter a user name and user password. This method may further comprise the step of the web site verifying the user name and user password before passing to the security system the user's token code.

Featured in another embodiment of the invention is a method of accomplishing two-factor user authentication, comprising providing two separate user authentication methods, enabling a user to communicate authentication data for both authentication methods to a first web site using the internet, enabling the communication of at least some of the authentication data from the first web site to a second web site using the internet, wherein both web sites are involved in user authentication using the authentication data.

In this method, the first web site may initially authenticate the user based on the data relating to one of the authentication methods. The first web site may initially authenticate the user based on the data relating to one of the authentication methods. The second web site may complete user authentication based on the data relating to the other authentication method. The first web site may communicate with the second web site only if the user is initially authenticated. The first web site may communicate to the second web site at least data relating to the other authentication method, and user-identification data.

In this method, one authentication method may employ a password, and one authentication method may employ a token. The token may be hardware-based, and generate a code that comprises at least some of the data for the authentication method. The token may be a stand-alone, portable device. The token may be USB-based, and accessed by a browser. The token may be software-based, and generate a code that comprises at least some of the data for the authentication method. The token may comprise a browser plug-in.

One authentication method may employ a fixed complex code. The fixed complex code may comprise a public key infrastructure. In one embodiment, one authentication method is software-based. At least one user authentication method can be used across multiple web sites. The token may be embedded in a device such as a cell phone.

BRIEF DESCRIPTION OF THE DRAWINGS

Other objects features and advantages will occur to those skilled in the art from the following description of the preferred embodiment, and the accompanying drawings, in which.

DESCRIPTION OF THE PREFERRED EMBODIMENT

This invention may be accomplished in a method of accomplishing two-factor user authentication over the internet. Two separate user authentication methods are provided. In the preferred embodiment, one method uses a user name and password system, and the other method uses a token-based system. See FIG. 1 for a schematic diagram of a system that can accomplish the invention. The user 12 is required to communicate authentication data for both authentication methods to a first web site 14 using the internet 12. Typically, this web site is the web site of a business with which the user is communicating. An example would be a brokerage account.

Figure 1:
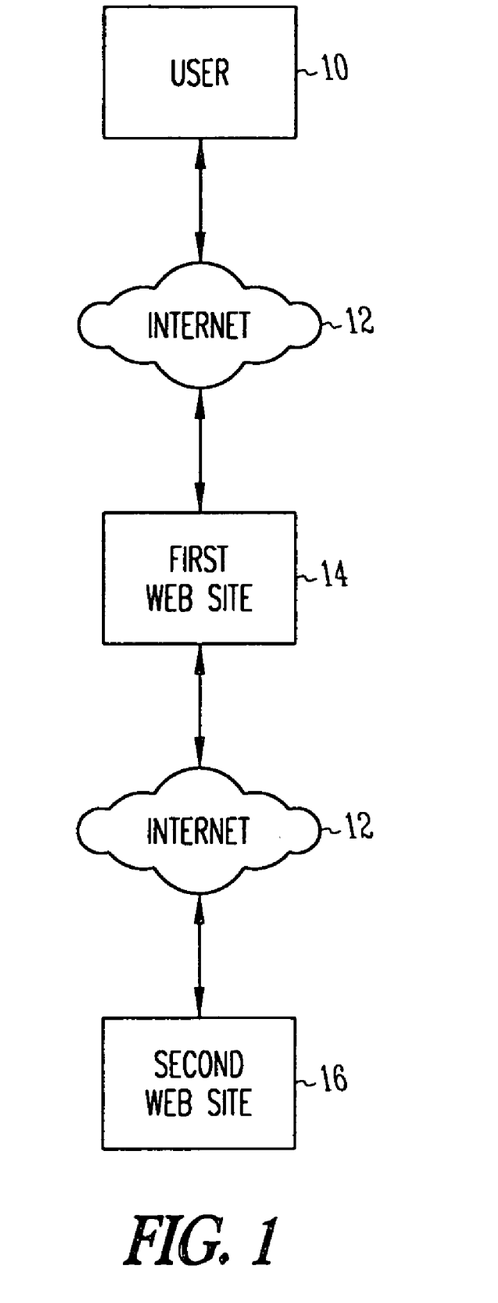
FIG. 1 is a schematic high-level diagram of the system for this invention.

One of the authentication methods is accomplished at the first web site 14. Typically, this comprises verification based on the user name and password. The first web site 14 then communicates at least some of the authentication data to the second web site 16, also using the internet 12. For the preferred embodiment, the first web site 14 would transmit to the second web site 16 the token code and an identification of the user resulting from the first authentication method. The second web site 16 would then accomplish the second authentication method to complete authentication of the user. The second web site 16 would then transmit back to the first web site 14 the results of the second authentication, so that the first web site 14 could then accept or deny access to the user.

The following are definitions of several terms used below:

| | |
|---|---|
| FiPass | Authentication Service provided by FiPass Inc. (the assignee herein) |
| FSS | FiPass Secured Site - Any site using the FiPass services and which conforms to certain guidelines. |
| FiPass Token | A 'key ring' sized device similar to a car alarm controller. The token is an existing network security device that produces a unique code each time it is used. |
| End User | A customer that utilizes the FiPass Authentication system at any FSS |
| Billed User | An End User who is responsible for the cost of the FiPass Authentication System |
| Pre-Paid User | An End User who is not responsible for the monthly charge or the shipping charge of the initial FiPass token |
| FiPass Code | The code produced by the FiPass token when the user presses the button, used to authenticate FiPass Users. |
| FiPass Web Site | The software located at www.fipass.com, which is the public FiPass, Inc. web site. The FiPass Web Site includes pages that allow FiPass Users to change their personal information. |
| FiPass Server | The software component located at secure.fipass.com, used for the FiPass Authentication System. |
| FiPass Client | The software component located at the FSS used to collect FiPass User information and to communicate that information with the FiPass Server. Can be in form of a COM object or JAVA Bean or other server side code (perl . . . ), also can run on any platform that can communicate over HTTPS. |
| Billing | The Software component used by FiPass to communicate with the Credit Card processor. |
| Fulfillment | The Software component used by FiPass to communicate with the token fulfillment provider, to package and ship tokens to end users. |

System Features:

System Features Supported:

The inventive FiPass system will support the following Solution Model Use Cases. The description also details the methodology in this invention that accomplishes the preferred token-based security for the second authentication method.

| Action | Description |
|---|---|
| 1. Online service network administrator and FiPass admin setup service. | The FiPass client software must be installed on the FSS web site and the FSS must be enabled at FiPass. |
| 2. End User enrolls in FiPass. | The End User decides to utilize the FiPass authentication system and enrolls by filling out an online form. |
| 3. FSS performs a batch enrollment of multiple End Users. | Any FSS may choose to underwrite the FiPass authentication system and enroll multiple users at once. |
| 4. End User receives confirmation email along with confirmation number. | After an End User successfully enrolls with FiPass, an email with a confirmation number is sent to the End User. |
| 5. End User is flagged for Fulfillment. | End user is set to receive a new token in the mail. |
| 6. FiPass network administrator adds tokens to FiPass database. | When tokens are fulfilled, the token serial numbers along with the seed value for each SN must be entered in the database. |
| 7. End User receives the token in the mail. | After the enrollment process is completed, the End User receives the token in the mail. |
| 8. End User activates token. | Once the token has been received, it must be activated before it can be used. |
| 9. End User activates token at another FSS | Once enrolled with FiPass at one FSS, tokens may be used at any FSS where End Users have accounts. |
| 10. End User activates replacement token | After an End User receives a replacement token, it is activated at www.fipass.com. |
| 11. FSS software modifies End User's login requirements. | FSS database must be modified to show that the End User is required to login using the FiPass authentication system. |
| 12. End User authenticates using FiPass system. | After the End User activates the token, authentication takes place using the inventive FiPass system. |
| 13. End User modifies personal information at FiPass.com. | An End User can modify personal information such as Billing Address, etc. |
| 14. FiPass corrects mandatory billing failure | The FiPass system attempts to correct failed charges that are considered mandatory. |
| 15. FiPass CSR assists an End User. | An End User can receive a defective token or need help in using the FiPass system; the CSR is there to provide assistance. |
| 16. FiPass CSR request alternative billing info after failure of a discretionary charge. | If a billing process fails while the user is on the phone with a CSR, the CSR will request alternative billing info. |
| 17. FiPass CSR request alternative billing info after failure of a mandatory charge. | If a billing process fails while the user is on the phone with a CSR, the CSR will request alternative billing info. |
| 18. End User loses FiPass Token. | If an End User loses a token, it will need to be replaced. |
| 19. FiPass bills users for the FiPass Authentication Service. | FiPass bills users for the FiPass Authentication Service, as well as shipping costs and replacement token fees (if applicable). |
| 20. End User deactivates the FiPass authentication system at a particular FSS. | The End User can deactivate the FiPass system at any FSS while it is still activated at another FSS. |
| 21. End User cancels the FiPass authentication system. | The End User can cancel the FiPass system if all his or her FSS accounts have been deactivated. |
| 22. FiPass Management gets reports. | For business analysis purposes, FiPass management needs to get reports on web site usage and the growth in FiPass accounts. |
| 23. User Returns Defective Token | If users receive a defective token or the token become inoperable, it will need to be replaced. |
| 24. User Reinstates cancelled account | If user's account has been |

| Action | Description |
| --- | --- |
| | cancelled due to a billing failure and was unaware of the failed charge, the account can be reinstated. |

Authentication

Figure 2:
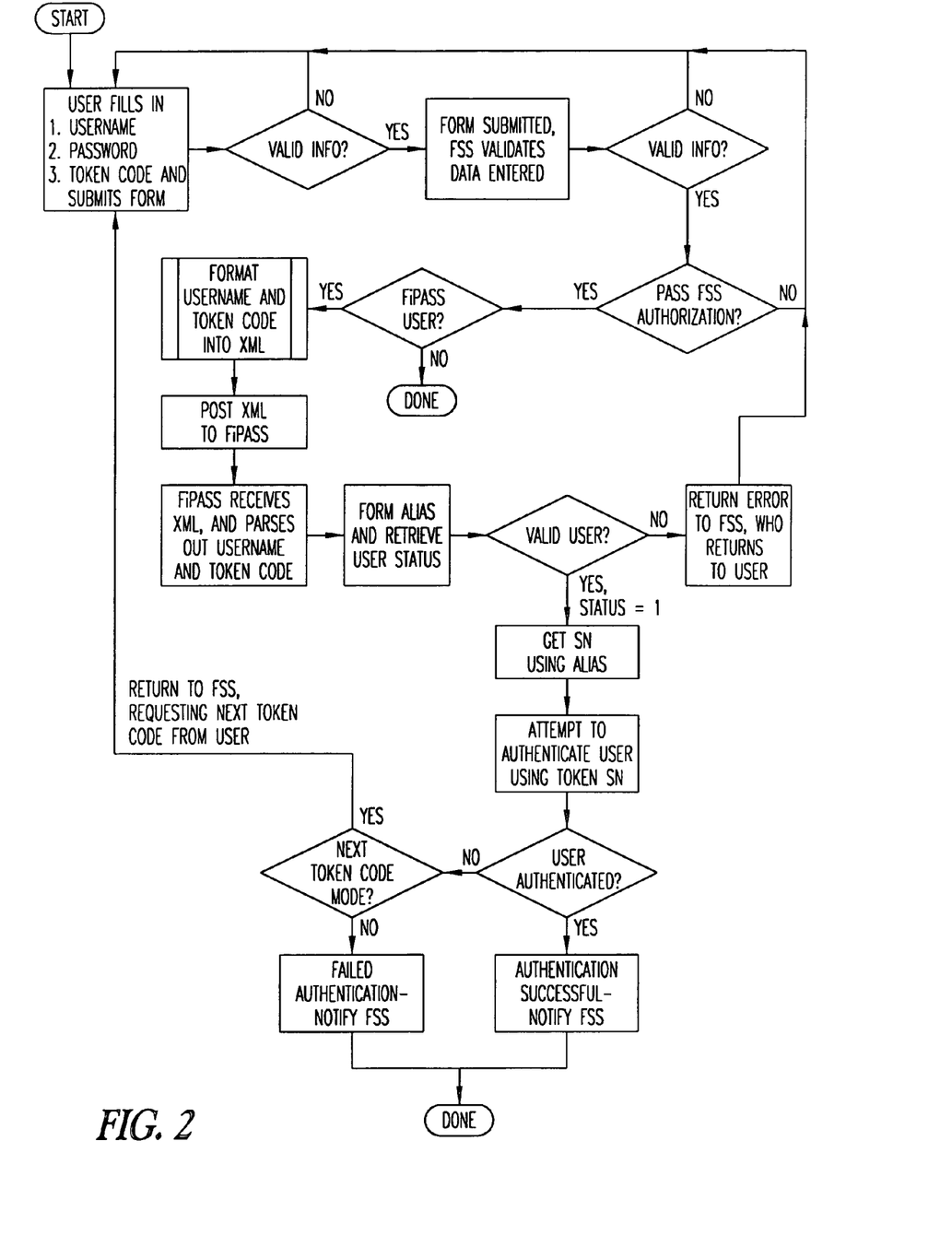
FIG. 2 is a flow chart of the preferred login process for the invention.
Figure 3:
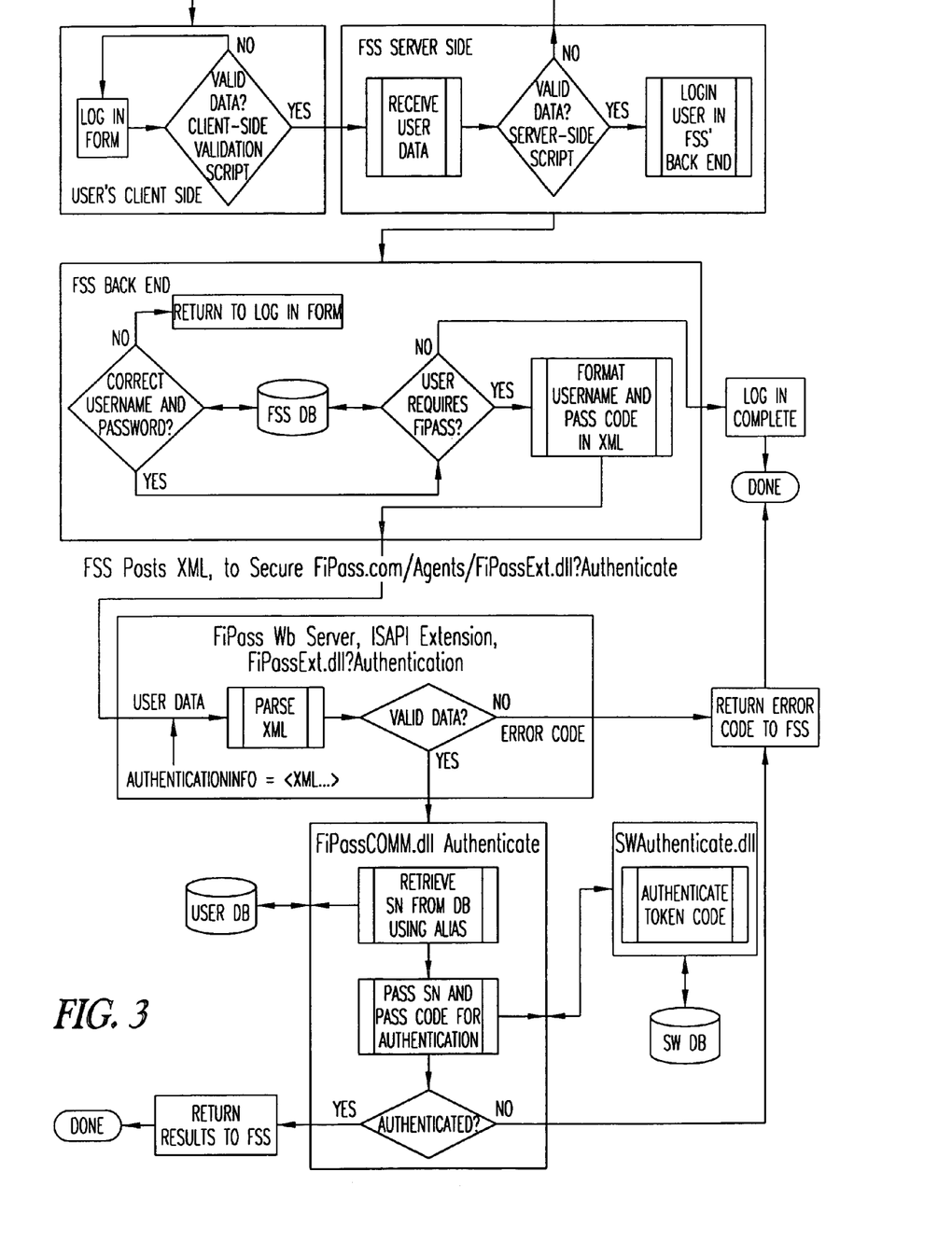
FIG. 3 is a flow chart of the preferred overall authentication process for the invention.

Two-factor authentication is the main piece of the inventive system and method. Authentication takes place at both the FSS client side and server side, as well as at FiPass. FIGS. 2 and 3 detail the preferred authentication process. The user enters in his/her username, password, and one-time pass code in the login form at the FSS. Client side script validates the data entered and then the information is submitted to the FSS. The FSS authenticates the user using the username and password. Once the FSS has determined that the password belongs to that user, the FSS then determines if the user requires FiPass for further authentication. If so, the FSS formats the data in XML and posts that data to Secure.FiPass.com. An ISAPI extension is installed on the web servers, which receives the request for authentication and parses the XML and passes it to the business object. The business object determines the token SN bypassing the user's username to a stored procedure which looks it up in the user database. The token SN and the one-time pass code are passed to the authentication object, SWAuthenticate.dll, to authenticate the user. The SWAuthenticate.dll object wraps the functionality of the libswecapi2.dll, which has all the functionality needed to access the SW DB for authenticating. SWAuthenticate.dll utilizes all that functionality and is abled to be called from other objects that can make use of that functionality for the authentication process.

The separate objects required for authentication are listed just below, and further described below.

Figure 4:
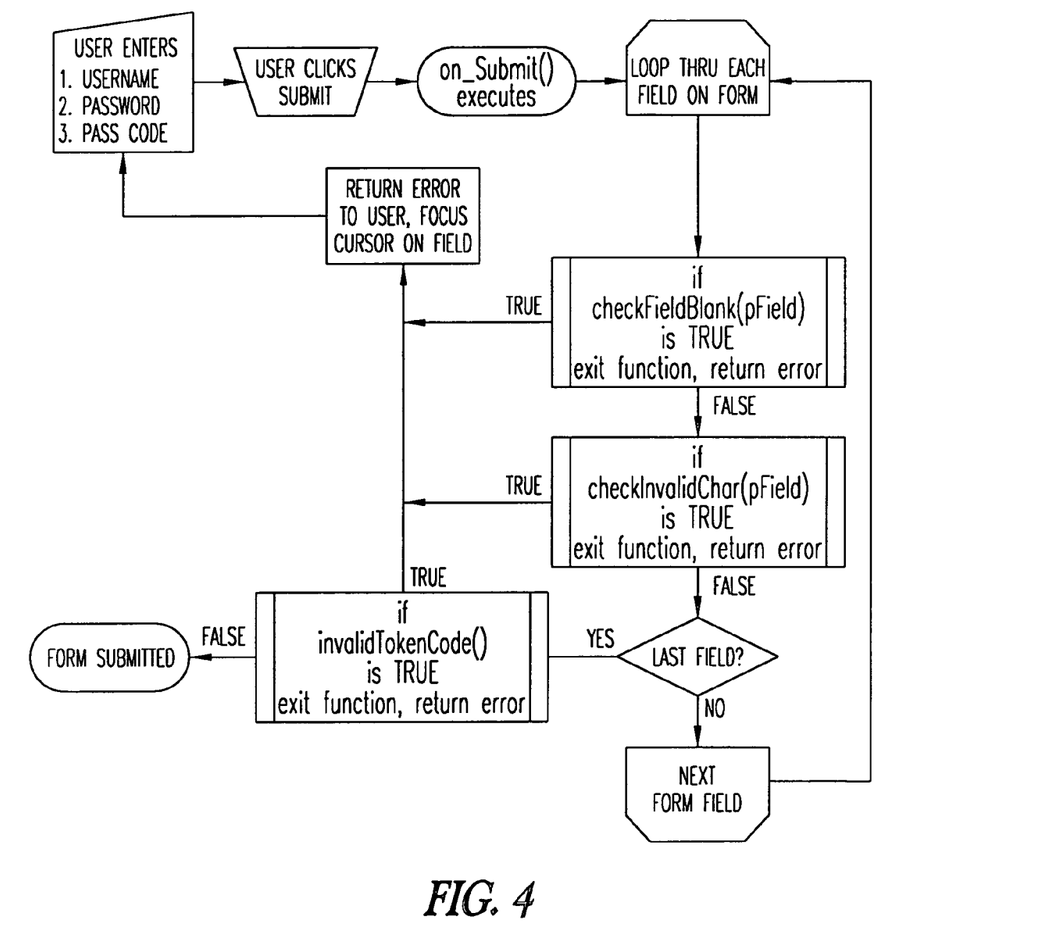
FIG. 4 is a more detailed flow chart of the client side authentication object of the authentication process of FIG. 3.

Client Side Authentication
FSS Server Side Authentication
FiPassExt.dll?Authenticate
FiPassCOM.dll
SWAuthenticate.dll Client Side Authentication (See FIG. 4)

Authentication begins when users log in at the FSS. Users enter their username, password and one-time pass code into the log in form and click the submit button. When the button is clicked, client side java script executes validating the data. If any data is invalid, the form is not submitted and the cursor is located on the field with invalid data. Valid data is submitted to the FSS where the FSS Server Side Authentication takes place and returns the user to the log in form if any data is invalid.

Figure 5:
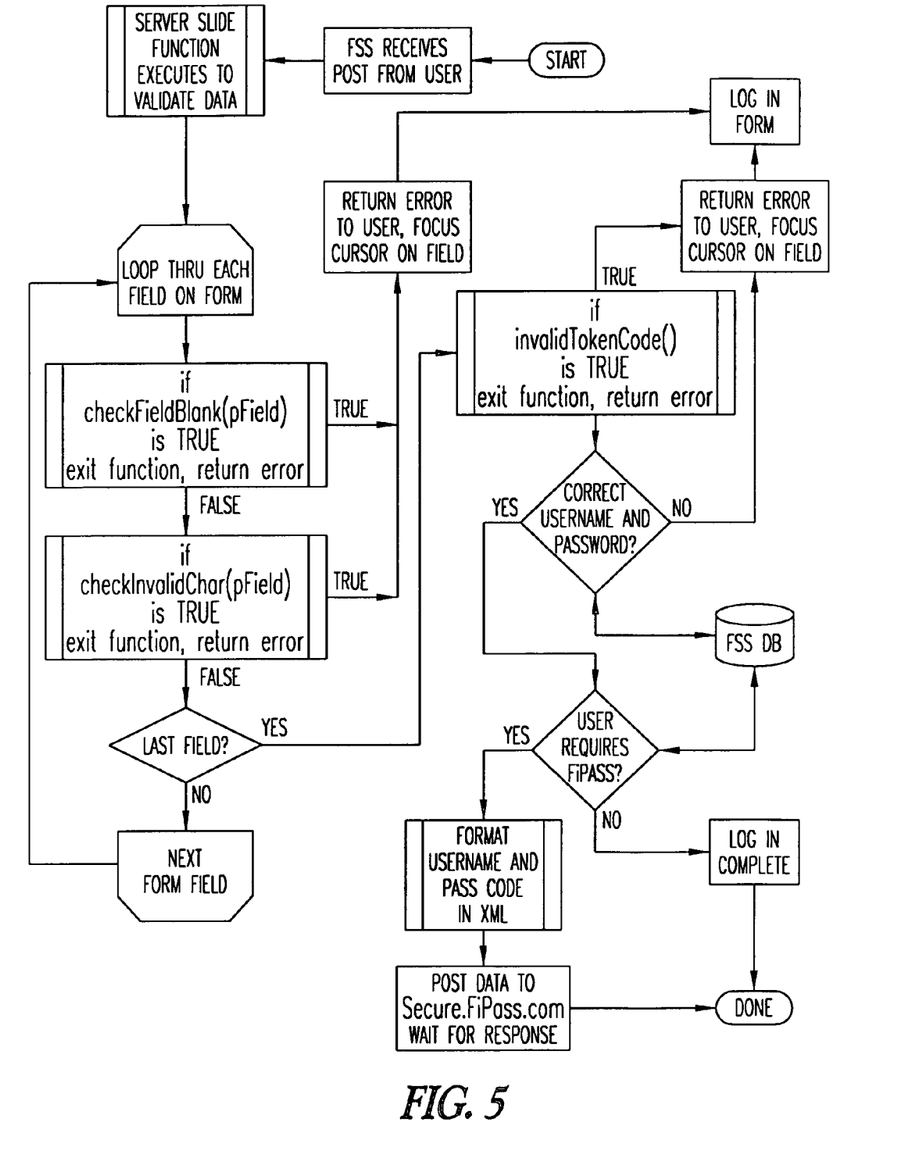
FIG. 5 is a more detailed flow chart of the server side authentication object of the authentication process of FIG. 3.

FSS Server Side Authentication (see FIG. 5)

When the user has successfully entered in valid data in the log in form at the FSS, the FSS will also validate the data entered by the user similar to the client side script. The FSS then authenticates the user using their normal method (username and password). Once the FSS authenticates the user, the FSS then checks if the user requires FiPass. If no FiPass is required then the user proceeds into the web site. However, if FiPass is required for the user, the FSS formats the username, one-time pass code and ClientID in XML and posts it to Secure.FiPass.com. The data is then posted using 1 parameter 1. authenticationinfo
   for example, https://secure.fipass.com/agents/
fipassext.dll?Authentication?authenticationinfo=<?xml version=1.0 standalone=yes?><authenticationinfo>....

After the data is sent to Secure.FiPass.com, the FSS will wait for the results in the form of a response from Secure.FiPass.com.

FiPassExt.dll?Authenticate

Figure 6:
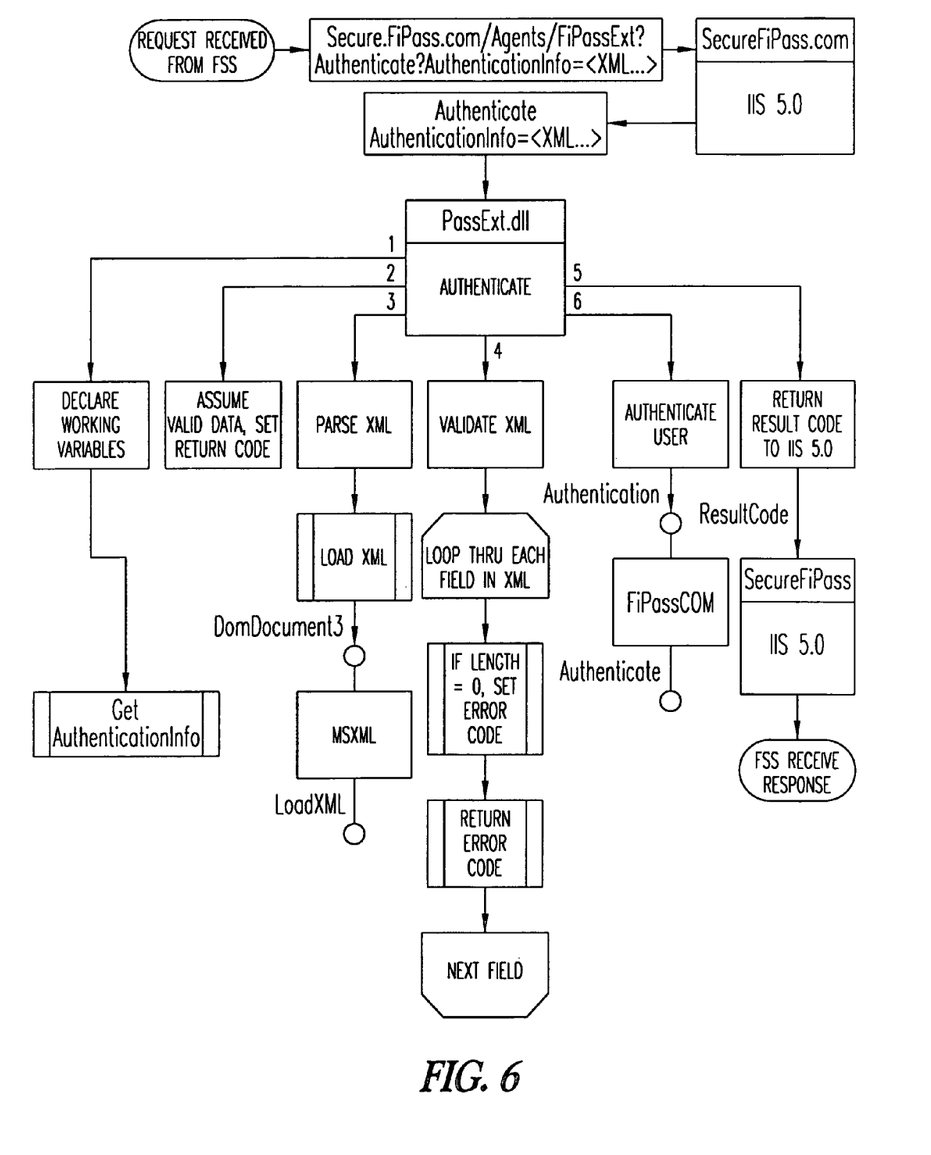
FIG. 6 is a more detailed flow chart of the authentication ISAPI extension object of the authentication process of FIG. 3.

The authentication data that is received by Secure.FiPass.com is in the form of 1 parameter using a name value pairs and is sent using the standard HTTP 'post' method. An ISAPI extension (see FIG. 6) is installed on the web servers, which receive the requests. In order to receive specific fields and field types, the ISAPI extension must know what fields it is going to receive and their variable types. This is done in the command-parsing map, located in a file that is generated by the wizard. The following lines must be added in order to receive the specific parameters sent by the FSS:

ON_PARSE_COMMAND(Authenticate, FiPassExtension, ITS_PSTR)
    ON_PARSE_COMMAND_PARAMS("AuthenticateInfo")

The first line tells IIS and the ISAPI extension (the class FiPassExtension) the "Authenticate" function is to be executed when a request has been received and 2 parameters of type integer and string will be sent in the request. The second line defines the parameter names that will be sent as part of the request.

Once the data is received from the FSS, it must be checked for validity before further processing. If the data is not in a valid form, then a response specifying the invalid data will be sent to the FSS immediately and no other processing will take place. The Authenticate method does this validation, along with calling the business object, FiPassCOM.Authenticate to authenticate the user.

When the FSS makes a request to Secure.Fipass.com, IIS first receives that request and then calls the Authenticate function that exists in the FiPassExt.dll extension. IIS passes the function a pointer to CHTTPServerContext and the XML string that was sent by the FSS. The pointer is used to communicate back and forth with IIS, which communicates back and forth with the FSS. In the ISAPI extension, the function declaration has 2 parameters, a pointer to the CHTTPServerContext, so it can communicate back to IIS after the processing is completed, and the XML parameter sent from the FSS.

Below is a list of requirements for this function.

To parse the XML that is received

After parsing, each XML tag set that holds a piece of required data is checked for blank values If any required fields are blank, an error code is immediately returned to the FSS and no further processing will take place.

Figure 7:
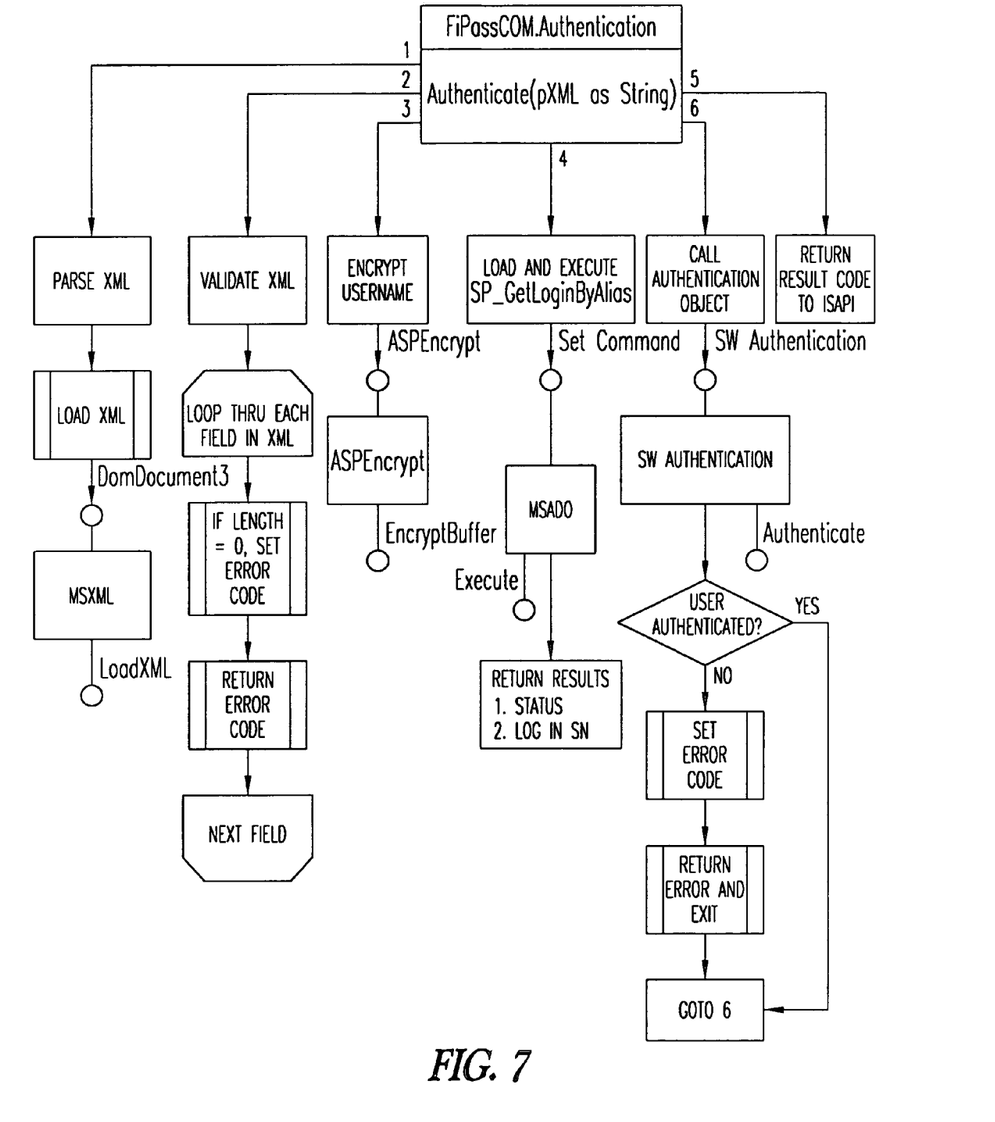
FIG. 7 is a more detailed flow chart of the authentication COM functionality object of the authentication process of FIG. 3.

If all fields are valid, the Authentication object (located in FiPassCOM.dll) is called and is passed the XML string received from the FSS The Authentication object performs its task (see FiPassCOM.dll) and returns its results (pass or fail) to the ISAPI extension and IIS, who passes it back to the FSS FiPassCOM.dll (see FIG. 7)

When requests are made to Secure.FiPass.com for authentication, the ISAPI extensions validate the data and pass off the valid XML to business objects, which carry out the request. FiPassCOM.dll holds all the objects, which carry out all the requests FSS' can make. Each object is in the form of a class within the FiPassCOM.dll. Each class has a specific task. The authentication functionality will take place in the Authentication class. The Authentication class contains the method called Authenticate, which requires the following functionality.

Receive XML string from ISAPI extensions.
Parse XML and set local variables
Call SP_GetLoginbyAlias and pass it the username and ClientID, which is used to retrieve the token SN to be used to authenticate the user
The result from SP_GetLoginbyAlias is returned to the Authentication object which then calls SWAuthenticate to do the authentication
The results from SWAuthenticate are returned back to the Authentication object (FiPassCOM.dll) which passes it back to the ISAPI extension and IIS, who passes it back to the FSS
All requests made by an FSS will utilize the user database. The FiPassCOM.dll object handles all user database access depending on the request. Using the MS ADO object, stored procedures are executed, which are compiled and running inside the database process.

Figure 8:
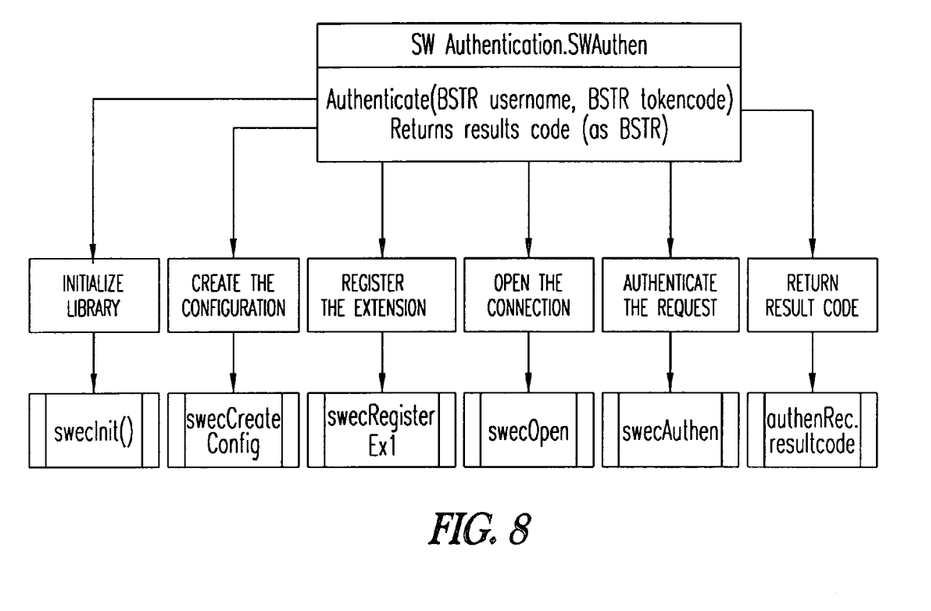
FIG. 8 is a more detailed flow chart of the token code authentication object of the authentication process of FIG. 3.

SWAuthenticate.dll (see FIG. 8)

The object used to communicate with the SW DB is SWAuthenticate.dll. This object wraps the functionality that is required to access the SW DB and authenticate users. It is called from the business objects and always receives 2 strings, the token SN and the one-time pass code, and returns one string, which is either pass or fail.

Other embodiments will occur to those skilled in the art and are within the scope of the claims.

What is claimed is:

1. A method of accomplishing two-factor user authentication, comprising:
   providing first and second user authentication methods, wherein the first user authentication method is an authentication method selected from authentication methods based on what a user knows and authentication methods based on a characteristic of the user and the second user authentication method is based on a token distributed to the user;
   communicating authentication data for both user authentication methods to a first web site using the internet;
   authenticating the user at the first web site using the first user authentication method;
   if the user is successfully authenticated at the first web site, enabling the communication of token-based authentication data corresponding to the token from the first web site to a second web site using the internet, the authentication data including a token code;
   authenticating the user at the second web site based on the token-based authentication data transferred from the first web site;
   transmitting results of the authentication at the second web site to the first web site; and
   if the authentication at the second web site is unsuccessful, restricting access to sensitive web content on the first web site.

2. The method of claim 1, wherein the first web site initially authenticates the user based on the data relating to the first user authentication method.

3. The method of claim 1, wherein the first web site communicates to the second web site data identifying the user.

4. The method of claim 1, wherein the first user authentication method employs a password.

5. The method of claim 1, wherein the token is hardware-based, and generates the token code.

6. The method of claim 5, wherein the token is a stand-alone, portable device.

7. The method of claim 5, wherein the token is USB-based and is accessed by a browser.

8. The method of claim 1, wherein the second user authentication method employs a fixed complex code.

9. The method of claim 8, wherein the fixed complex code comprises a one-time password encrypted using a public key infrastructure.

10. The method of claim 1, wherein the second user authentication method is software-based.

11. The method of claim 1, wherein at least one user authentication method can be used across multiple web sites.

12. The method of claim 1, wherein the token is embedded in a cell phone.

13. A method of adding a second method of authentication to a first web site performing a first method of authentication, the method including:
   distributing a token to a user, the token producing a token code;
   providing a second website to authorize the user based on the token code;
   receiving the token code and authentication data for the first method of authentication at the first web site;
   receiving authorization data at the second web site from the first website, the authorization data including user identification data and the token code from the first web site upon the first web site successfully authorizing the user using the first authentication method;
   authorizing the user at the second web site based on the token code and the user identification data; and
   if the authorization at the second website is successful, transmitting data to the first web site indicating the user has been successfully authenticated using at least two methods of authentication, wherein the user is granted access to web content on the first web site only if the user has been authenticated using at least two methods of authentication.

14. A method of adding a second method of authentication to a plurality of web sites performing a first method of authentication, the method including:
   distributing a token to a user, the token producing a token code;
   providing an authentication web site to authorize the user based on the token code;
   receiving the token code and authentication data for the first method of authentication at a first web site from the plurality of web sites;
   receiving authorization data from the first web site, the authorization data including user identification data and the token code from the first web site upon the first web site successfully authorizing the user using the first authentication method;
   authorizing the user at the authentication web site based on the token code and the user identification data; and
   if the authorization at the authentication website is successful, transmitting data to the first web site indicating the user has been successfully authenticated using at least two methods of authentication, wherein the user is granted access to web content on the plurality of web sites only if the user has been authenticated using at least two methods of authentication.

* * * * *

UNITED STATES PATENT AND TRADEMARK OFFICE
CERTIFICATE OF CORRECTION

PATENT NO.        : 7,590,859 B2
APPLICATION NO.   : 10/050752
DATED             : September 15, 2009
INVENTOR(S)       : Sean Brennan It is certified that error appears in the above-identified patent and that said Letters Patent is hereby corrected as shown below:

In column 7, line 27, delete "bypassing" and insert -- by passing --, therefor.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,590,859 B2 | Page 1 of 1 |
| APPLICATION NO. | : 10/050752 | |
| DATED | : September 15, 2009 | |
| INVENTOR(S) | : Sean Brennan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1261 days.

Signed and Sealed this

Twenty-first Day of September, 2010

David J. Kappos
*Director of the United States Patent and Trademark Office*